United States Patent
Tiedemann, Jr. et al.

(10) Patent No.: US 6,535,478 B2
(45) Date of Patent: Mar. 18, 2003

(54) REDUCED PEAK-TO-AVERAGE AMPLITUDE MULTICHANNEL LINK

(75) Inventors: Edward G. Tiedemann, Jr., San Diego, CA (US); Ramin Rezaiifar, San Diego, CA (US); Olivier Glauser, San Diego, CA (US); Tao Chen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/908,665

(22) Filed: Jul. 17, 2001

(65) Prior Publication Data

US 2001/0038605 A1 Nov. 8, 2001

Related U.S. Application Data

(63) Continuation of application No. 08/877,295, filed on Jun. 17, 1997.

(51) Int. Cl.[7] .......................... H04J 13/02; H04B 1/707; H04L 27/36
(52) U.S. Cl. ........................ 370/206; 370/342; 370/532; 370/537; 375/146
(58) Field of Search .................................. 370/206, 342, 370/532, 537, 540, 320, 441; 375/130, 146, 298, 302

(56) References Cited

U.S. PATENT DOCUMENTS

| | | | | |
|---|---|---|---|---|
| 5,302,914 A | * | 4/1994 | Arntz et al. ................. | 330/129 |
| 5,448,555 A | * | 9/1995 | Bremer et al. ............... | 370/206 |
| 5,559,788 A | * | 9/1996 | Zschelle, Jr. et al. ........ | 370/206 |
| 5,668,795 A | * | 9/1997 | Magill et al. ................ | 370/209 |
| 5,793,797 A | * | 8/1998 | Giallorenzi et al. ........ | 375/259 |
| 5,805,567 A | * | 9/1998 | Ramesh ....................... | 370/206 |
| 5,838,732 A | * | 11/1998 | Carney ....................... | 370/206 |
| 5,910,964 A | * | 6/1999 | Sugita ........................ | 375/200 |
| 6,044,103 A | | 3/2000 | Weaver, Jr. ................. | 375/130 |
| 6,097,714 A | * | 8/2000 | Nagatani et al. ............ | 370/342 |

FOREIGN PATENT DOCUMENTS

| | | |
|---|---|---|
| EP | 0652650 | 5/1995 |
| WO | 9217011 | 10/1992 |
| WO | 9613918 | 5/1996 |

OTHER PUBLICATIONS

Gimlin, D.R. "On Minimizing the Peak–to–Average Power Ration for the Sum of N Sinusoids" IEEE Transactions on Communications 41(4): 631–635 (Apr. 1993).

* cited by examiner

*Primary Examiner*—Min Jung
(74) *Attorney, Agent, or Firm*—Philip Wadsworth; Kent D. Baker; Pavel Kalousek

(57) ABSTRACT

A novel and improved method and apparatus for generating a reduced peak amplitude high data rate channel comprised of a set of lower rate channels is described. The set of lower rate channels are phase rotated before being summed and transmitted. The amount of phase rotation is dependent on the number of channels used to form the higher rate channel. In an embodiment where two lower rate channels are used, the in-phase and quadrature-phase components of the two channels are complex multiplied before upconversion with an in-phase and quadrature-phase sinusoids. For a high rate channel comprised of more than two lower rate channels, the in-phase and quadrature-phase component of each channel is upconverted with a set of sinusoids that are phase offset from one another.

24 Claims, 7 Drawing Sheets

REDUCED PEAK-TO-AVERAGE AMPLITUDE MULTICHANNEL LINK

CROSS REFERENCE

This is a continuation application of U.S. application No. 08/877,295, filed Jun. 17, 1997, now abandoned, entitled "Reduced Peak-to-Average Amplitude Multichannel Link," and currently assigned to the assignee of the present application.

BACKGROUND OF THE INVENTION

I. Field of the Invention

The present invention relates to wireless telecommunications. More particularly, the present invention relates to a novel and improved method and apparatus for generating a reduced peak-to-average amplitude high data rate channel using of a set of lower rate channels.

II. Description of the Related Art

The IS-95 standard defines an over the air interface for providing more efficient and robust cellular telephone service using code division multiple access (CDMA) technology. CDMA technology allows multiple channels to be established within the same radio frequency (RF) electromagnetic spectrum by modulation of the data to be transmitted with one or more pseudorandom noise (PN) codes. FIG. 1 provides a highly simplified illustration of a cellular telephone system configured in accordance with the use of IS-95. Mobile telephones 10 (also referred to as wireless terminals) communicate with base stations 12 via CDMA modulated RF signals, and base station controllers 14 provide call control functionality that allows mobile telephony to take place. Mobile switching center (MSC) 16 provides call routing and switching functionality to public switch telephone network (PSTN) 18.

Conducting communications within the same RF band allows adjacent base stations to use the same RF spectrum, which increases the efficiency with which the available bandwidth is used. Other cellular standards typically require adjacent base station to use different RF spectrum. Using the same RF band also facilitates performing "soft handoff," which is a more robust method of transitioning a wireless terminal (typically a cellular telephone) between the coverage area of two or more base stations. Soft handoff is the state of simultaneously interfacing the wireless terminal with the two or more base stations 12, which increases the likelihood that at least one interface will be maintained at all times during the transition. Soft handoff can be contrasted to the hard handoff employed by most other cellular telephone systems where the interface with the first base station is terminated before the interface with the second base station is established.

Another benefit of using the same RF band to conduct communications is that the same RF equipment may be used to transmit a set of lower rate channels. This allows the same RF equipment to be used to generate a higher rate channel formed by multiplexing the higher multiplexed over the set of lower rate channels. Transmitting multiple channel using the same RF equipment is in contrast to frequency division and time division multiple access (FDMA and TDMA) systems, which generally cannot simultaneously transmit multiple channels using the same RF equipment since the channels are frequency divided to a greater degree than in a CDMA system. This ability to transmit higher rate channels using the same RF equipment has become another important advantage of IS-95, as the world wide web, video conferencing, and other networking technologies has created a need for such higher rate channels.

Although higher rate channels are more easily formed within a CDMA system by channel bundling, the overall system performance resulting from this bundling is not optimal. This is because summing multiple channels creates a higher peak-to-average amplitude waveform than that of a lower rate serial channel. For example, for a serial channel the amplitude of the data waveform is either +1 to −1, in accordance with the BPSK data modulation employed by IS-95. Thus, the peak-to-average ratio is essentially that of a sin wave. For a higher rate channel that sums four lower rate channels, the amplitude of the waveform can be +4, −4, +2, −2 and 0. Thus, the peak-to-average amplitude of the bundled channel would be significantly greater than a sin wave, and therefore significantly higher than the non-bundled channel.

An increased peak-to-average amplitude places greater demands on the transmit amplifier of a system, and can reduce the maximum data rate or maximum range at which a system can operate. This is due to several factors, the most important of which is that the average data rate is dependent on the average transmit and receive power, and a higher peak-to-average amplitude waveform requires a greater maximum transmit power to sustain a given average transmit power. Therefore, a larger, and more expensive, transmit amplifier is required to provide the same performance for a higher peak-to-average waveform. Nonetheless, it is highly desirable to generate a higher data rate channel in a CDMA by bundling a set of lower rate channels. Thus, there is a need for a method an apparatus for reducing the peak-to-average transmit amplitude ratio for a set of bundled lower rate CDMA channels.

SUMMARY OF THE INVENTION

The present invention is a novel and improved method and apparatus for generating a reduced peak-to-average amplitude high data rate channel using of a set of lower rate channels. The set of lower rate channels are phase rotated before being summed and transmitted. The amount of phase rotation is dependent on the number of channels used to form the higher rate channel. In an embodiment where two lower rate channels are used, the in-phase and quadrature-phase components of the two channels are complex multiplied before upconversion with an in-phase and quadrature-phase sinusoids. For a high rate channel comprised of more than two lower rate channels, the in-phase and quadrature-phase component of each channel is upconverted with a set of sinusoids that are phase offset from one another.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

A method and apparatus for generating a reduced peak-to-average amplitude high data rate channel using of a set of lower rate channels is described. In the following description, the invention is set forth in the context of a signal generated in accordance with the IS-95 reverse link waveform. While the invention is especially suited for use with such a waveform, the invention may also be used with signals generated in accordance with other protocols. For example, the invention may be used in systems which generate signals in accordance with the IS-95 forward link waveform. A system and method for generating signals substantially in accordance with the use of the IS-95 standard is described in U.S. Pat. No. 5,103,459 entitled "System and Method for Generating Signal Waveforms in a CDMA Cellular Telephone System" assigned to the assignee of the present invention and incorporated herein by reference.

Figure 1:
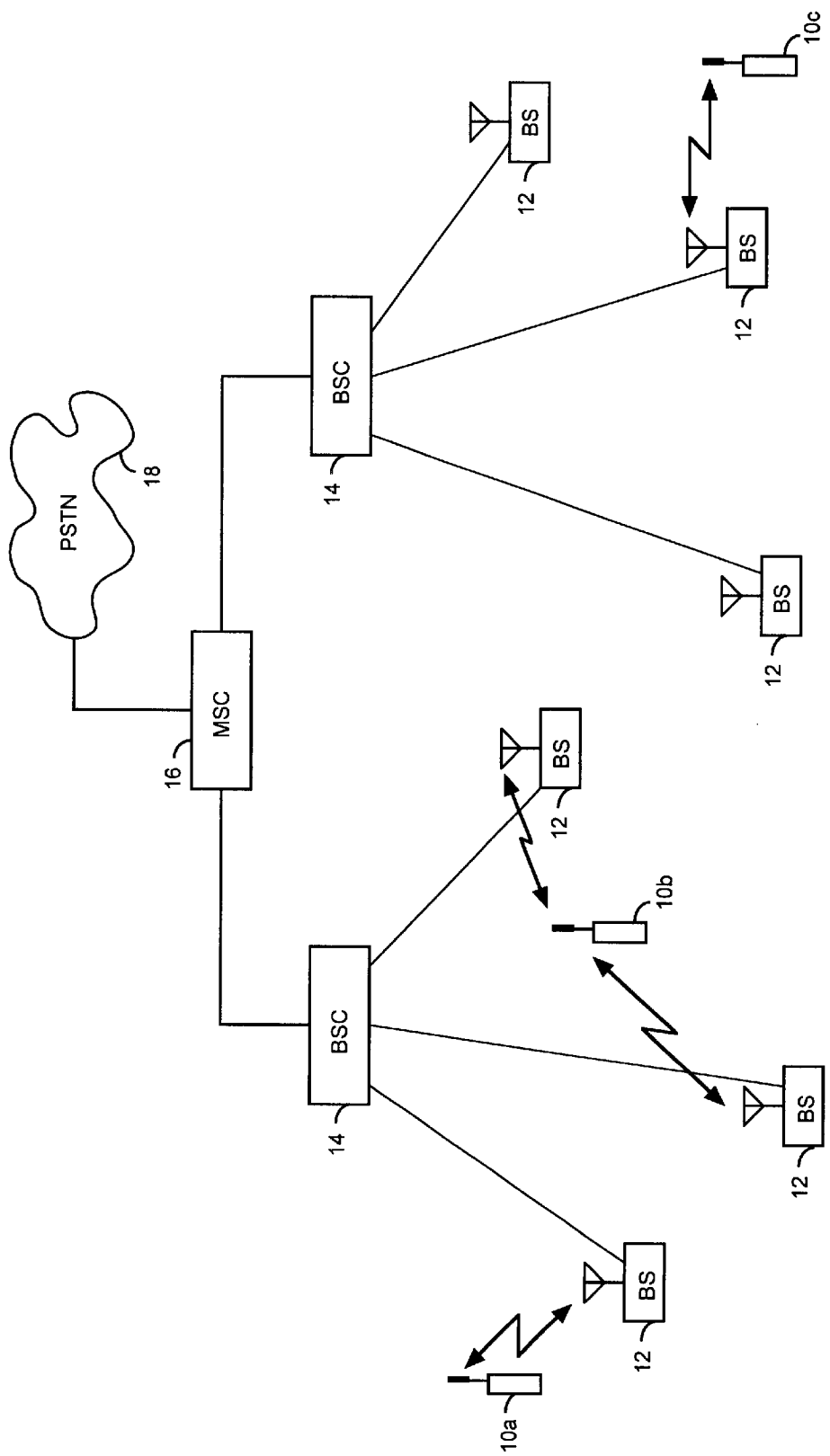
FIG. 1 is a block diagram of a cellular telephone system.
Figure 2:
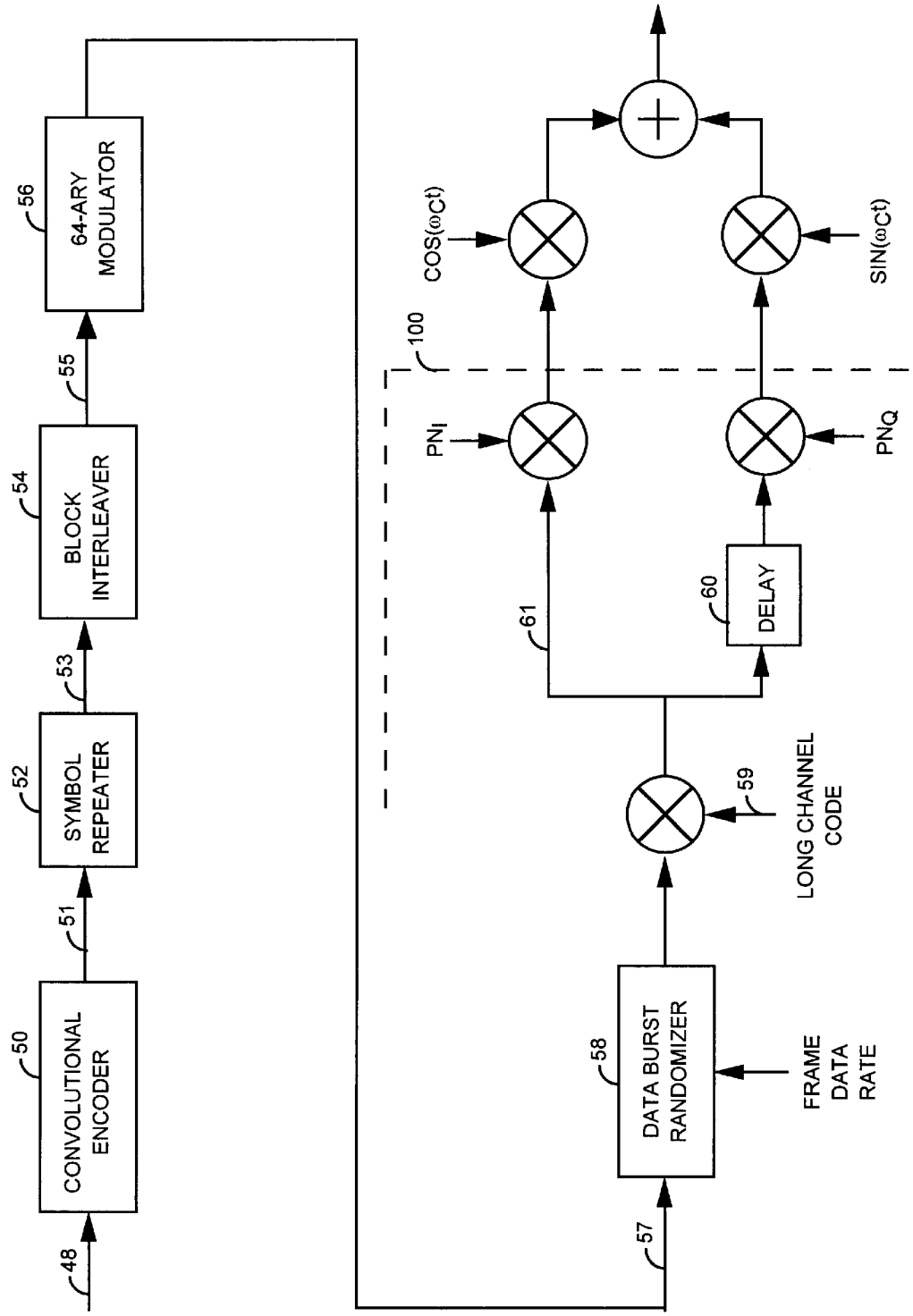
FIG. 2 is a block diagram of a transmit system used to generate a reverse link signal.

FIG. 2 is a block diagram of a transmit system employed by a wireless terminal 10 to generate a single reverse link traffic channel in accordance with the IS-95 standard. Data 48 being transmitted is provided to convolutional encoder 50 in 20 ms segments, called frames, at one of four rates referred to as "full rate", "half rate", "quarter rate", and "eighth rate" respectively, as each frame contains half as much data as the previous and therefore transmits data at half the rate. Data 48 is typically variable rate vocoded audio information from a data source such as a vocoder system where lower rate frames are used when less information is present such as during a pause in a conversation. Convolution encoder 50 convolutionally encodes data 48 producing encoded symbols 51, and symbol repeater 52 generates repeated symbols 53 by symbol repeating encoded symbols 51 by an amount sufficient to generate a quantity of data equivalent to a full rate frame. For example, three additional copies of a quarter rate frames are generated for a total of four copies. No additional copies of a full rate frame are generated.

Block interleaver 54 then block interleaves the repeated symbols 53 to generate interleaved symbols 55. Modulator 56 performs 64-ary modulation on interleaved symbols 55 to produce Walsh symbols 57. That is, one of sixty-four possible orthogonal Walsh codes, each code consisting of sixty-four modulation chips, is transmitted and indexed by every six interleaved symbols 55. Data burst randomizer 58 performs gating, using frame rate information, on Walsh symbols 57 in pseudorandom bursts such that only one complete instance of the data is transmitted.

The gated Walsh chips are then direct sequence modulated using a pseudorandom (PN) long channel code 59 at rate of four long channel code chips to each Walsh chip generating modulated data 61. The long channel code forms the channelization function for the reverse link and is unique for each mobile telephone 10 and is known by each base station 12. For the forward link, to which the invention is also applicable, a shorter Walsh code is used for channelization.

Modulated data 61 is duplicated with the first copy being "spread" via modulation with an in-phase pseudorandom spreading code ($PN_I$) producing I-channel data, and the second copy, after being delayed one half the duration of a spreading code chip by delay 60, is spread via modulation with a quadrature-phase spreading code ($PN_Q$) producing Q-channel data. The I-channel data and the Q-channel data are both low pass filtered (not shown), before being used to phase shift key (PSK) modulate in-phase and quadrature-phase carrier signals respectively. The modulated in-phase and quadrature-phase carrier signals are summed together before transmitted to a base station or other receive system (not shown).

Dashed line 100 indicates the boarder between the processing performed within a first integrated circuit (to the left) and an RF system (to the right) in one implementation of the invention. Thus, integrated circuits that perform the processing to the left and above of dividing line 100 for a single channel are available and widely used. Also, it should be understood that any reference to carrier signals simply implies a system for upconverting a signal to the carrier frequency, which may involve the use of a series of upconversion steps, mixing steps, and sinusoidal signals. Additionally, while the invention is described in the context of performing offset-QPSK spreading, its general principals may also be applied to systems performing other well known modulation techniques including QPSK and BPSK modulation.

Figure 3:
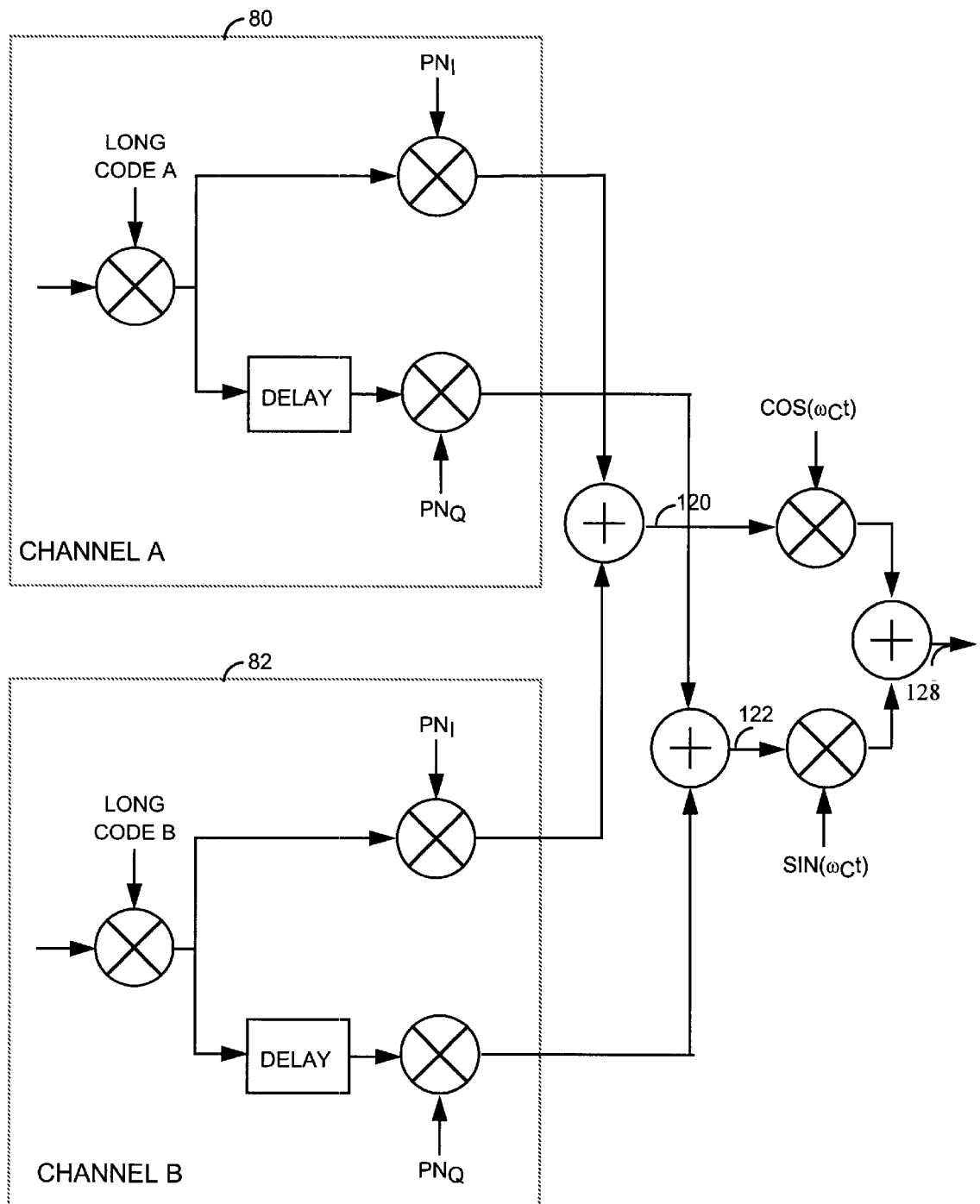
FIG. 3 is a block diagram of a high rate transmit system.

FIG. 3 is a block diagram of a transmit system used for generating a high rate. link by bundling two lower rate channels that does not incorporate certain aspects of the invention. Preferably, CHANNEL A is generated within a first integrated circuit 80 and CHANNEL B is generated with a second integrated circuit 82, however, such a configuration is not necessary to practice the invention. Also, CHANNEL A and CHANNEL B are preferably coded in accordance with the processing of a single channel as described above with respect to FIG. 2 (coding not shown). Within integrated circuit 80, CHANNEL A is modulated with a channel A long code (long code A) and spread with in-phase spreading code PNI and, after a one-half chip delay, quadrate-phase spreading code PNQ. Similarly, within integrated circuit 82, CHANNEL B is modulated with channel B long code (long code B) and spread with in-phase spreading code PNI and, after a one-half chip delay, quadrate-phase spreading code PNQ.

Long codes A and B should be unique to allow the channels to be demodulated independently, and are preferably orthogonal to one another. Various methods and systems for generating sets of channel codes are known or may be readily developed. One method is described in U.S. Pat. No. 5,442,625 entitled "CODE DIVISION MULTIPLE ACCESS SYSTEM PROVIDING VARIABLE DATA RATE ACCESS TO A USER" incorporated herein by reference. Others systems and methods are described in copending U.S. patent applications Ser. No. 08/654,443 entitled "HIGH DATA RATE CDMA WIRELESS COMMUNICATION SYSTEM" and Ser. No. 08/847,231 entitled "SYSTEM AND METHOD FOR TRANSMITTING AND RECEIVING HIGH SPEED DATA IN A CDMA WIRELESS COMMUNICATION SYSTEM" filed on May 1st 1997, both assigned to the assignee and incorporated herein by reference.

Outside integrated circuits 80 and 82, the PNI spread CHANNEL A data is summed with the PNI spread CHANNEL B data yielding summed in-phase data 120. Additionally, the PNQ spread CHANNEL A data is summed with the PNQ spread CHANNEL B data yielding summed quadrature-phase data 122. As should be apparent, summed in-phase data 120 and summed quadrature-phase data 122 can have values of +2, 0 and −2, where a value of −1 is used to represent a logic zero and a value of +1 is used to represent a logic one. Summed in-phase data 120 is upconverted with an in-phase carrier, and summed quadrature-phase data 122 is upconverted with a quadrature-phase carrier, and the resulting upconverted signals are summed generating transmitted signal 128.

Figure 4:
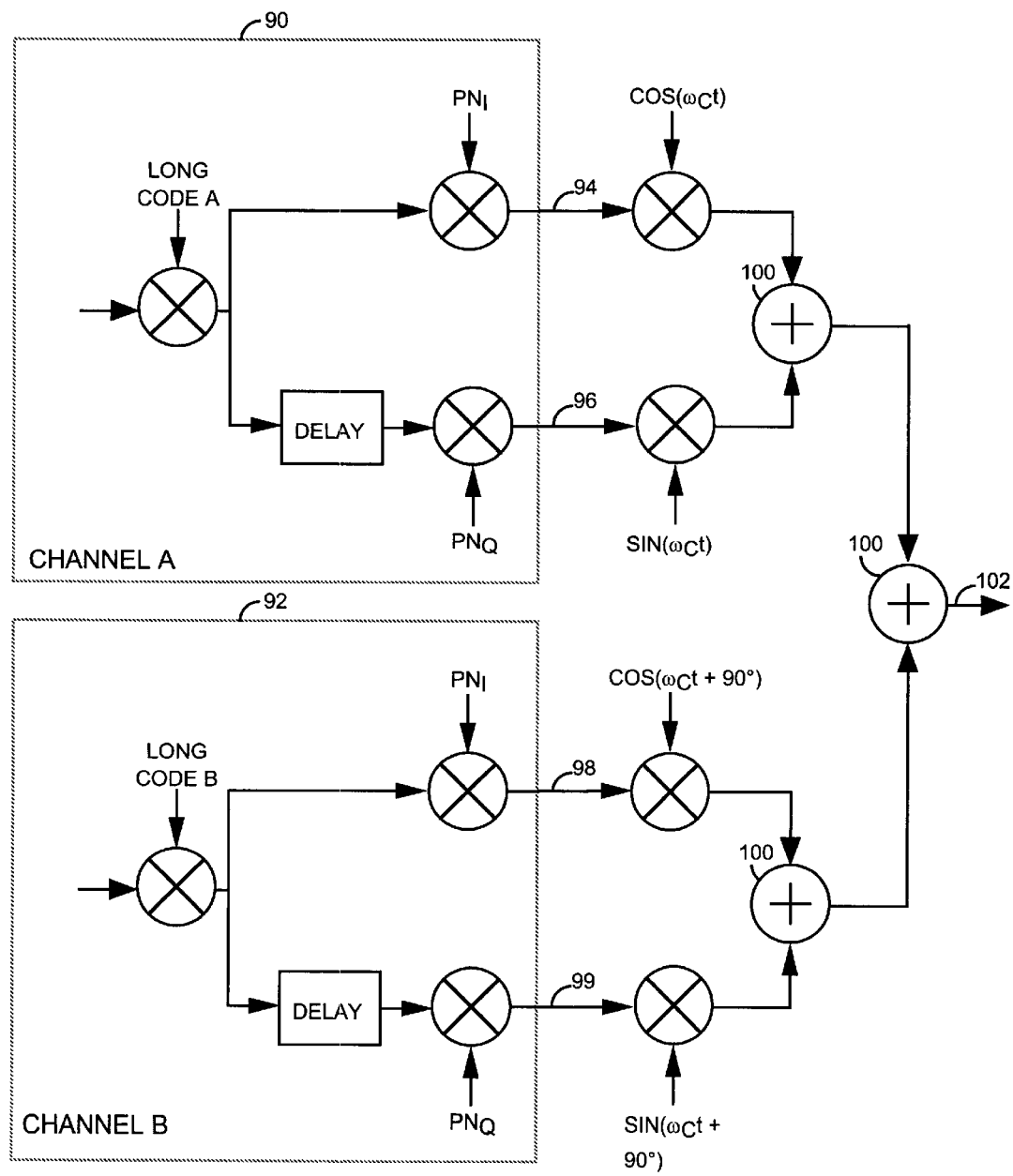
FIG. 4 is a block diagram of a high rate transmit system configured in accordance with one embodiment of the invention.

FIG. 4 is a block diagram transmit system used for generating a high rate link by bundling two lower rate channels when configured in accordance with one embodiment of the invention. CHANNEL A is generated within a first integrated circuit 90 and CHANNEL B is generated with a second integrated circuit 92. CHANNEL A and CHANNEL B are preferably coded in accordance with the processing of a single channel as described above with respect to FIG. 2 (coding not shown). Within integrated circuit 90, CHANNEL A modulated with long code A and spread with in-phase spreading code PNI yielding in-phase CHANNEL A data 94 and, after a one-half chip delay, quadrature-phase spreading code PNQ yielding quadrature-phase CHANNEL A data 96. Similarly, within integrated circuit 92, CHANNEL B is modulated with long code B and spread with in-phase spreading code PNI yielding in-phase CHANNEL B data 98, and, after a one-half chip delay, spread with quadrate-phase spreading code PNQ yielding quadrature-phase CHANNEL B data 99.

Outside integrated circuit 90 and 92, in-phase CHANNEL A data 94 is modulated with 0°-phase carrier (COS$\omega_c$t)) and quadrature-phase CHANNEL A data 96 is modulated with 90°-phase carrier (SIN($\omega_c$t)). Additionally, in-phase CHANNEL B data 98 is modulated with 90°-phase carrier (COS$\omega_c$t+90°)) and quadrature-phase CHANNEL B data 96 is modulated with 180°-phase carrier (SIN($\omega_c$t+90°)). The resulting upconverting signals are summed by summers 100 yielding signal 102 comprised of two bundled lower rate links. As illustrated by FIG. 4, CHANNEL B is upconverted using in-phase and quadrature-phase carriers that are rotated by 90° with respect to the in-phase and quadrature-phase carriers that are used to upconvert CHANNEL A. Thus, CHANNEL B is said to be phase-rotated by 90° with respect to CHANNEL A. As illustrated below, phase rotating CHANNEL B by 90° with respect to CHANNEL A before summing reduces the peak transmit amplitude since the phases are offset and therefore do not fall into straight lines as vectors. Reducing the peak amplitude, increases the efficiency with which the RF transmit amplifier is used.

Figure 5:
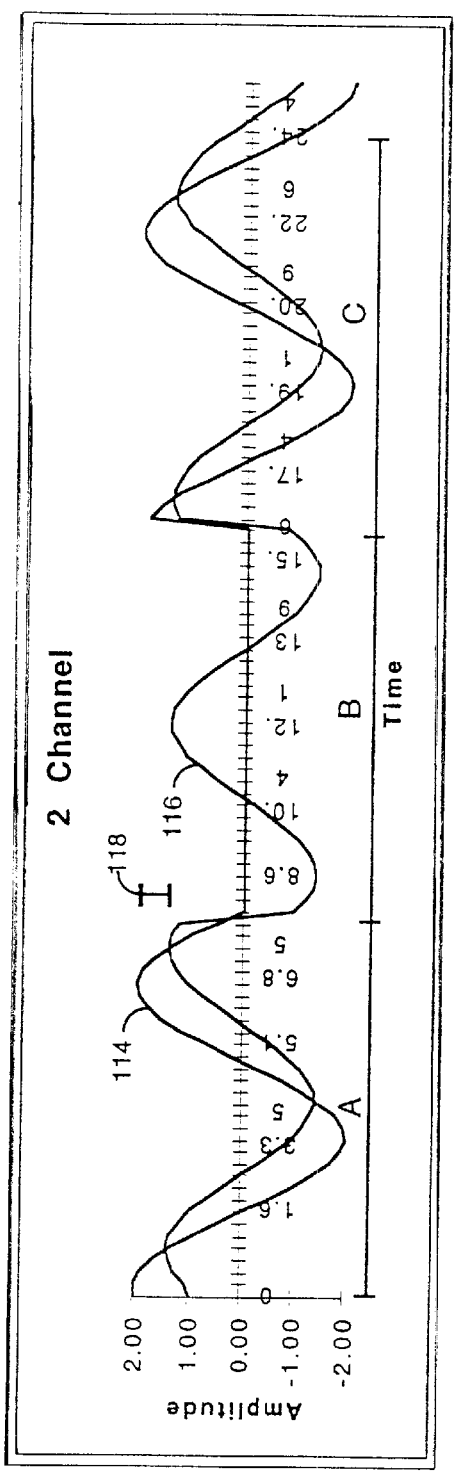
FIG. 5 is a graph of signals provided to illustrate the advantages of the invention.

FIG. 5 is a graph of the amplitude of various sinusoidal signals which illustrates the benefits of the present invention. Signal 114 is the transmit signal generated on the in-phase channel of the non-rotated high rate system shown in FIG. 2. Signal 116 is the transmit signal generated by in-phase channel of the phase-rotated high rate system shown in FIG. 3, where CHANNEL B is modulated with a sinusoids rotated by 90° with respect to CHANNEL A. Only the in-phase channel is shown to simplify illustration of the invention, however, the principles illustrated also apply to the quadrature-phase channel and the sum of the in-phase and quadrature phase channel. Times A, B and C indicate data transitions, thus defining three sets of data. During the three periods, the data being sent via CHANNELs A and B is (+1,+1), (+1,−1) and (−1,−1) respectively.

For the non-rotated signal 114, the signal transmitted during time A is (+1)COS($\omega_c$t)+(+1)COS($\omega_c$t) which is equal to (2)COS($\omega_c$t). During time B, signal 114 (+1)COS ($\omega_c$t)+(−1)COS($\omega_c$t), which sums to zero (0) as shown on the graph. During time C, the signal transmitted is (−1)COS ($\omega_c$t)+(−1)COS($\omega_c$t) which is equal to (−2)COS($\omega_c$t). Thus, signal 114 is typically comprised of either amplitude 2 sinusoid or a zero amplitude signal.

For rotated signal 116, the signal transmitted during time A is (+1)COS($\omega_c$t)+(+1)COS($\omega_c$t+90°) which is equal to (1.4)COS($\omega_c$t+45°). As should be apparent, this is a reduction in amplitude of approximately 30% with respect to signal 114 during that same time. Line 118 indicates the difference in the peak amplitude of signals 114 and 116 during time A. During time B, signal 116 is (+1)COS($\omega_c$t)+ (−1)COS($\omega_c$t+90°) which is equal to 1.4 COS($\omega_c$t−45°). During time C signal 116 is (−1)COS($\omega_c$t)+(−1)COS($\omega_c$t+ 90°) which is equal to (1.4)COS($\omega_c$t+215°). Thus, signal 116 is comprised of a series of amplitude 1.4 sinusoids, rather than the amplitude 2 sinusoid or zero amplitude signal of signal 114, and therefore has a lower peak-average ratio than signal 114. This same reduction in peak-to-average amplitude is experienced on the quadrature-phase component of the combined signal, thereby similarly reducing the overall peak-to-average transmit amplitude allowing for more efficient use of a transmit amplifier.

Figure 6:
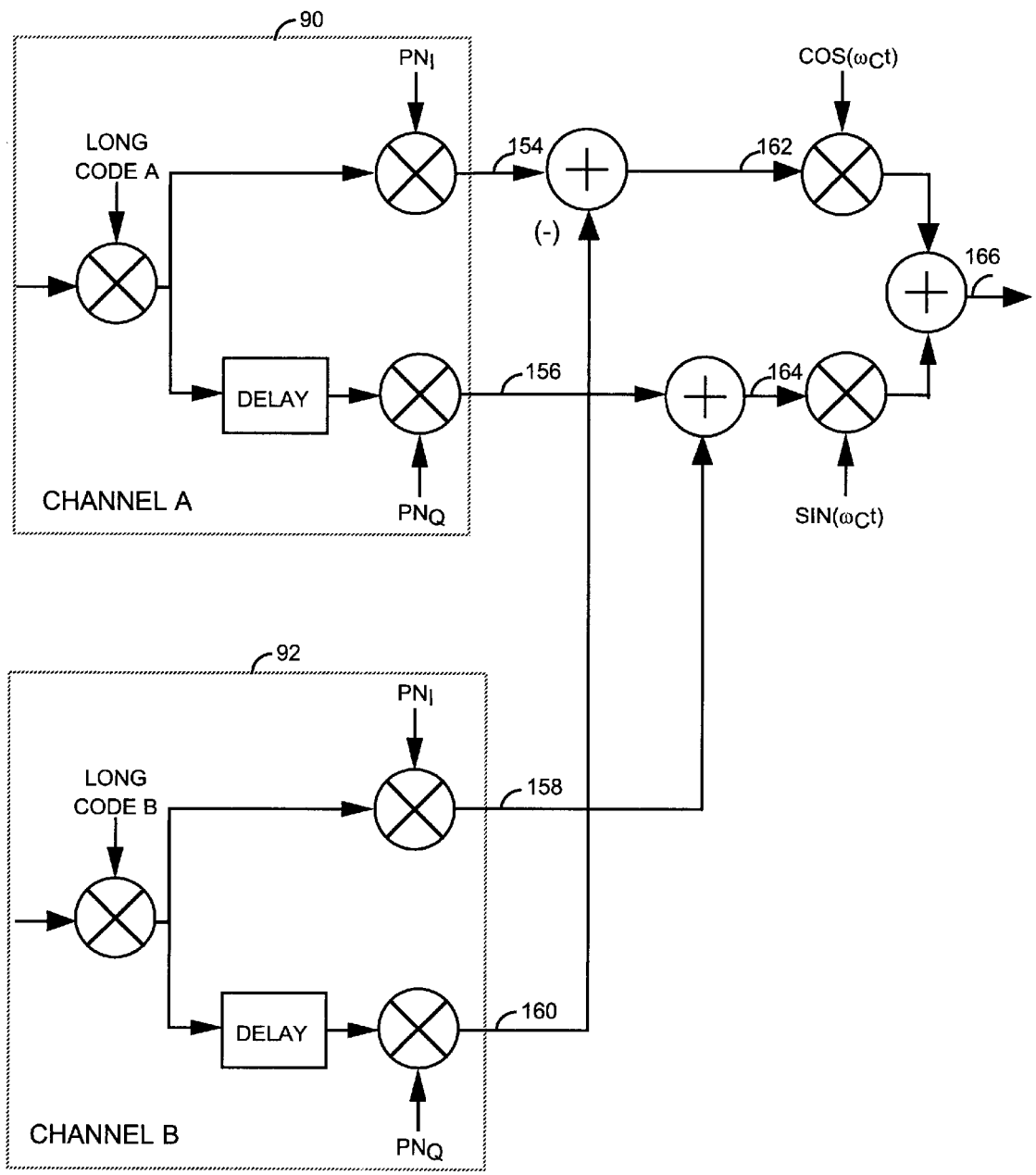
FIG. 6 is a block diagram of a high rate transmit system configured in accordance with another embodiment of the invention.

FIG. 6 is a block diagram of a transmit system configured in accordance with a second embodiment of the invention where two channels are bundled to form a higher rate channel. In similar fashion to that described above with respect to FIG. 4, integrated circuit 90 generates in-phase CHANNEL A data 154 and quadrature-phase CHANNEL A data 156, and integrated circuit 92 generated in-phase CHANNEL B data 158 and quadrature-phase CHANNEL B data 160.

Outside integrated circuits 90 and 92, in-phase CHANNEL A data 154 is summed with the negative of the quadrature-phase CHANNEL B data 160 generating summed in-phase data 162, and quadrature-phase CHANNEL A data 156 is summed with in-phase CHANNEL B data 158 yielding summed quadrature-phase data 164. Summed in-phase data 162 is upconverted with an in-phase carrier and summed quadrature-phase data 164 is summed with a quadrature-phase carrier, with the resulting upconverted signals summed and transmitted as signal 166.

Those skilled in the art will recognize this as the complex multiplication of CHANNEL A and CHANNEL B to generate result comprised of an in-phase (real) and quadrature-phase (imaginary) component, which are upconverted with the in-phase and the quadrature-phase carriers respectively. By performing the complex multiplication, the phase rotated waveform is generated without the need to generate additional phase offset sinusoids, thus simplifying the necessary transmit processing.

Figure 7:
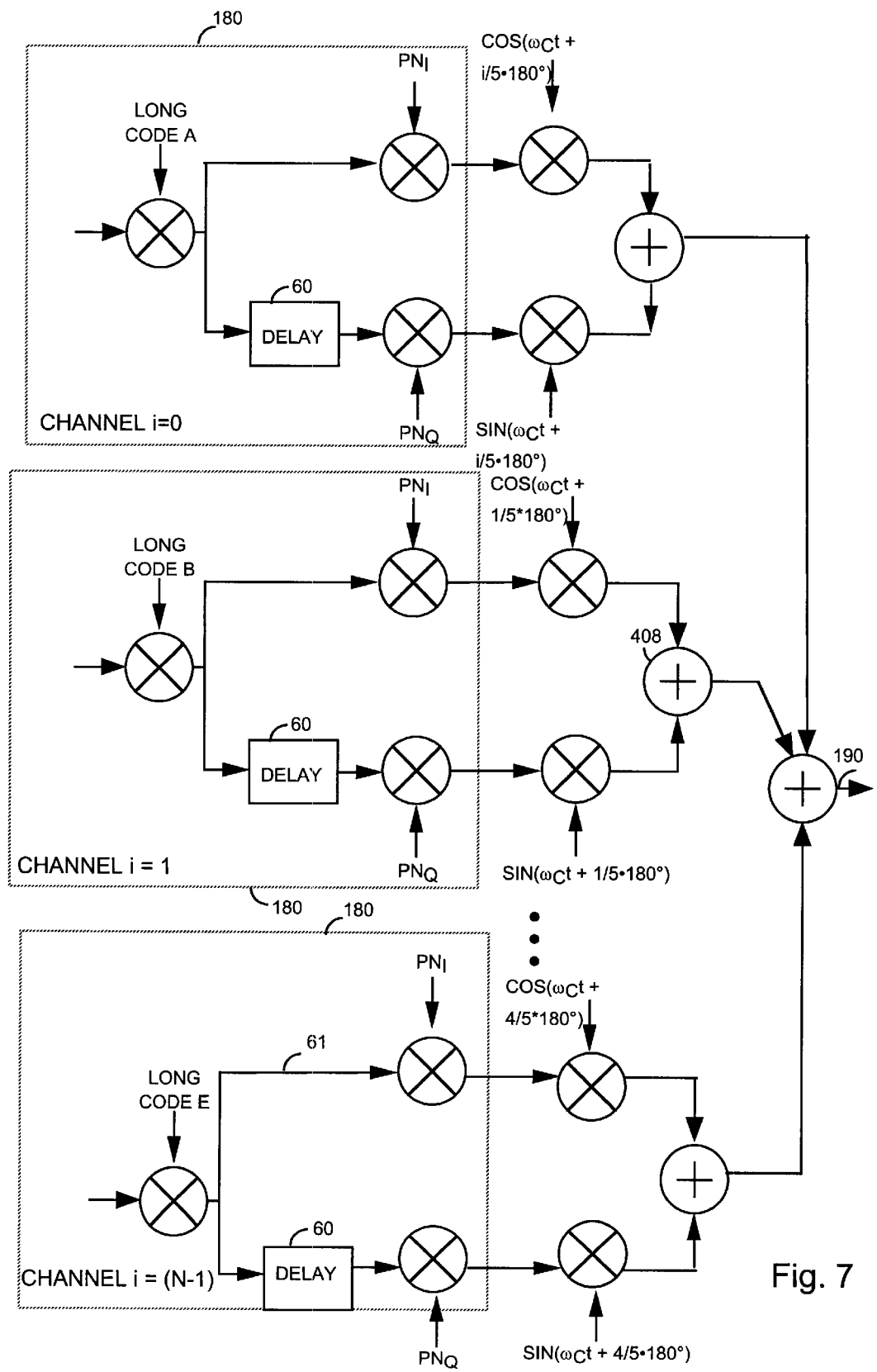
FIG. 7 is a block diagram of a high rate transmit system configured in accordance with another embodiment of the invention.

FIG. 7 is a block diagram of a transmit system configured in accordance with another embodiment of the invention in which a set of N channels are bundled to form a higher rate channel in accordance with one embodiment of the invention where N=5. Within integrated circuits 180 the in-phase and quadrature-phase components of CHANNELS i=0 . . . 4 are generated as described above with respect to integrated circuits 90 and 92. Outside integrated circuits 180, the in-phase component of each channel is upconverted using a sinusoids COS(?$_c$t+i/N·180°) where i is equal to the channel number as assigned herein, and N is equal to 5, which is the total number of channels being bundled to form the higher rate channel in the example shown. Similarly, the quadrature-phase component of each channel is upconverted using a sinusoid SIN(?$_c$t+i/N·180°). The resulting upconverted signals are summed together in 408 and transmitted as signal 190.

By rotating the phase of the carrier signals used for each channel i=0 to N−1 in a set of channels N by an amount i/N·180°, the peak transmit amplitude generated by the summed waveform is reduced relative to the peak amplitude of a signal formed by summed channels upconverted using non-rotated sinusoidal carriers. This is because phase rotating the set of sinusoidal signals eliminates coherence whereby the amplitudes of the set of signals all peak simultaneously. Thus, a given transmit amplifier can be used more efficiently to transmit the higher rate signal. While other phase offset spacing may be used, the use of phase offset spacing as described herein is preferred because it provides maximum, equal distance, phase differential.

Figure 8:
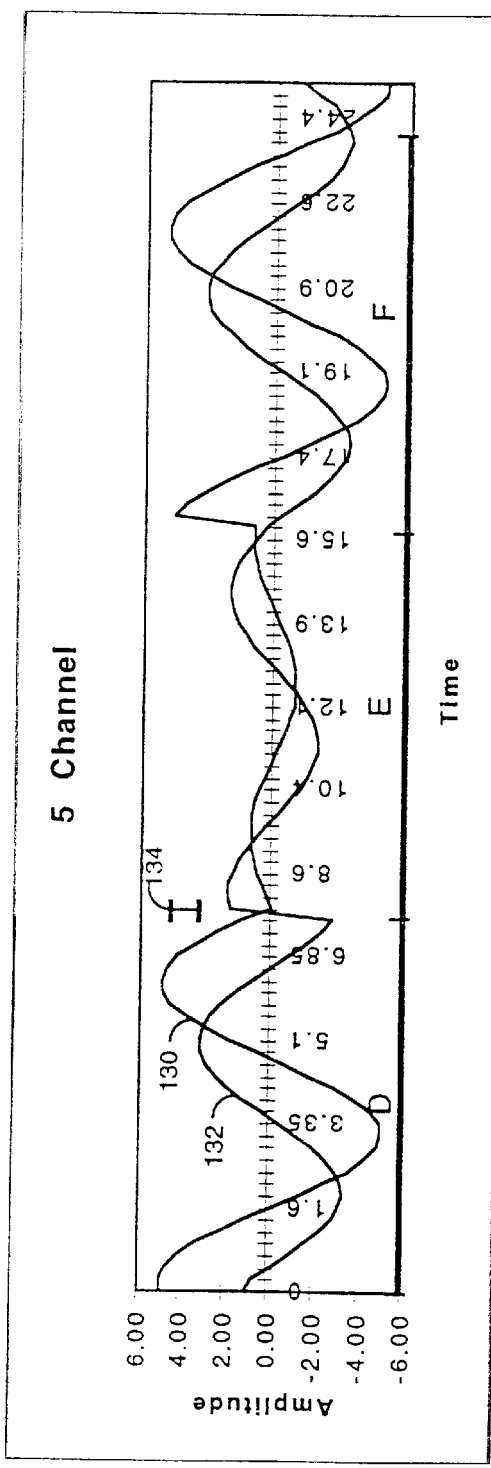
FIG. 8 is a graph of signals provided to illustrate the advantages of the invention.

FIG. 8 is a graph of the amplitude of various sinusoidal signals further illustrating the benefits of the present invention for the high rate channel of FIG. 7 comprised of 5 bundled lower rate channels. Signal 130 corresponds to the in-phase portion of a high rate channel generated by summing 5 non-rotated lower rate channels, referred to as CHANNELs A through E. Signal 132 corresponds to the in-phase portion of a the high rate channel generated by summing 5 phase rotated lower rate channels as shown in FIG. 7. Only the in-phase channel is shown to simplify illustration of the invention, however, the principles illustrated also apply to the quadrature-phase channel and the sum of the in-phase and quadrature phase channel. Times D, E and F indicate data transitions, thus defining three sets of data. During the three periods, the data being sent via CHANNELs A through E is (+1,+1,+1,+1,+1), (+1,−1,−1,−1,+1) and (−1,−1,−1,−1,−1) respectively.

It can be seen from FIG. 8 that the amplitude of the non-rotated signal 130 is greater than that of rotated signal 132 by an amount 134 during times D and F. This is because the five lower rate channels add coherently during times D and F, while the 5 rotated signals do not. During time E, the amplitude of non-rotated signal 130 is less than that of rotated signal 132. This is because the 5 non-rotated lower rate channels add more destructively during time E than the five rotated lower rate channels. Thus, phase rotated signal 132 more evenly spreads out the transmit energy over time, and therefore has a lower peak-to-average amplitude ratio than non-rotated signal 132. Therefore, the present invention allows transmit amplifiers to be used more efficiently including allowing lower cost amplifiers to be used, or for a given amplifier to be used at greater range.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for generating a higher rate channel from lower rate channels, comprising:

associating with each of at least three lower rate channels a sinusoid, each sinusoid being phase offset from all other sinusoids;

upconverting each lower rate channel using said associated sinusoid; and summing said upconverted lower rate channels.

2. The method as claimed in claim 1 wherein said associating with each of at least three lower rate channel a sinusoid, each sinusoid being phase offset from all other sinusoids comprises:

associating with each of at least three lower rate channel a sinusoid, each sinusoid being phase offset from all other sinusoids by a phase offset equal to 180°/N, where N is a number of lower rate channels.

3. The method as claimed in claim 1 further comprising transmitting said summed upconverted lower rate channels across an overlapping band of RF spectrum.

4. A method for generating a higher rate channel from lower rate channels, comprising:

associating with each lower rate channel a first sinusoid and a second sinusoid, each first sinusoid being phase offset from all other first sinusoids, and the first and the second sinusoids associated with a lower rate channel being phase offset by 90°;

upconverting an in-phase component of a lower rate channel using the first associated sinusoid for each lower rate channel;

upconverting a quadrature-phase component of a lower rate channel using the second associated sinusoid for each lower rate channel;

summing said upconverted in-phase component and said upconverted quadrature-phase component for the lower rate channel to provide an upconverted lower rate channels for each lower rate channel; and summing said upconverted lower rate channels.

5. The method as claimed in claim 4 wherein said associating with each lower rate channel a first sinusoid and a second sinusoid, each first sinusoid being phase offset from all other first sinusoids, and the first and the second sinusoids associated with a lower rate channel being phase offset by 90° comprises:

associating with each lower rate channel a first sinusoid and a second sinusoid, each first sinusoid being phase offset from all other first sinusoids by a phase offset equal to 180°/N, where N is a number of lower rate channels, and the first and the second sinusoids associated with a lower rate channel being phase offset by 90°.

6. The method as claimed in claim 4 further comprising transmitting said summed unconverted lower rate channels across an overlapping band of RF spectrum.

7. The method as claimed in claim 4 further comprising generating the lower rate channels.

8. The method as claimed in claim 7 wherein said generating the lower rate channels comprises:

encoding source data;

modulating said encoded data with a channel code;

creating a first copy of said modulated source data and a second copy of said modulated source data; and modulating the first copy with an in-phase code and the second copy with a quadrature code.

9. An apparatus for generating a higher rate channel from lower rate channels, comprising:

means for associating with each of at least three lower rate channels a sinusoid, each sinusoid being phase offset from all other sinusoids;

means for upconverting each lower rate channel using the associated sinusoid; and means for summing the upconverted lower rate channels.

10. The apparatus as claimed in claim 9 wherein the means for associating with each of at least three lower rate channels a sinusoid, each sinusoid being phase offset from all other sinusoids comprises:

means for associating with each of at least three lower rate channels a sinusoid, each sinusoid being phase offset from all other sinusoids by a phase offset equal to 180°/N, where N is a number of lower rate channels.

11. The apparatus as claimed in claim 9 further comprising means for transmitting the summed upconverted lower rate channels across an overlapping band of RF spectrum.

12. An apparatus for generating a higher rate channel from lower rate channels, comprising:

means for associating with each lower rate channel a first sinusoid and a second sinusoid, each first sinusoid being phase offset from all other first sinusoids, and the first and the second sinusoids associated with a lower rate channel being phase offset by 90°;

means for upconverting an in-phase component of a lower rate channel using the first associated sinusoid for each lower rate channel;

means for upconverting a quadrature-phase component of a lower rate channel using the second associated sinusoid for each lower rate channel;

means for summing the upconverted in-phase component and the upconverted quadrature-phase component for the lower rate channel to provide an upconverted lower rate channels for each lower rate channel; and means for summing the upconverted lower rate channels.

13. The apparatus as claimed in claim 12 wherein the means for associating with each lower rate channel a first sinusoid and a second sinusoid, each of the first sinusoids being phase offset from all other first sinusoids, and the first and the second sinusoids associated with a lower rate channel being phase offset by 90° comprises:

means for associating with each lower rate channel a first sinusoid and a second sinusoid, each first sinusoid being phase offset from all other first sinusoids by a phase offset equal to 180°/N, where N is a number of lower rate channels, and the first and the second sinusoids associated with a lower rate channel being phase offset by 90°.

14. The apparatus as claimed in claim 12 further comprising means for transmitting the summed upconverted lower rate channels across an overlapping band of RF spectrum.

15. The apparatus as claimed in claim 12 further comprising means for generating the lower rate channels.

16. The apparatus as claimed in claim 15 wherein the means for generating the lower rate channels comprises:

means for encoding source data;

means for modulating the encoded data with a channel code;

means for creating a first copy of the modulated source data and a second copy of the modulated source data; and means for modulating the first copy with an in-phase code and the second copy with a quadrature code.

17. An apparatus for generating a higher rate channel from lower rate channels, comprising:

a modulator configured to associate with each of at least three lower rate channels a sinusoid, each sinusoid being phase offset from all other sinusoids;

an upconvertor configured to upconvert each lower rate channel using the associated sinusoid; and a summer configured to sum the upconverted lower rate channels.

18. The apparatus as claimed in claim 17 wherein the modulator configured to associate with each of at least three lower rate channels a sinusoid, each sinusoid being phase offset from all other sinusoids comprises:

a modulator configured to associate with each of at least three lower rate channels a sinusoid, each sinusoid being phase offset from all other sinusoids by a phase offset equal to 180°/N, where N is a number of lower rate channels.

19. The apparatus as claimed in claim 17 further comprising a transmitter configured to transmit the summed upconverted lower rate channels across an overlapping band of RF spectrum.

20. An apparatus for generating a higher rate channel from lower rate channels, comprising:

a modulator configured to associate with each lower rate channel a first sinusoid and a second sinusoid, each first sinusoid being phase offset from all other first sinusoids, and the first and the second sinusoids associated with a lower rate channel being phase offset by 90°;

a first upconvertor configured to upconvert an in-phase component of a lower rate channel using the first associated sinusoid for each lower rate channel;

a second upconvertor configured to upconvert a quadrature-phase component of a lower rate channel using the second associated sinusoid for each lower rate channel;

a first summer configured to sum the upconverted in-phase component and the upconverted quadrature-phase component for the lower rate channel to provide an upconverted lower rate channels for each lower rate channel; and a second summer configured to summing the upconverted lower rate channels.

21. The apparatus as claimed in claim 20 wherein the modulator configured to associate with each lower rate channel a first sinusoid and a second sinusoid, each first sinusoid being phase offset from all other first sinusoids, and the first and the second sinusoids associated with a lower rate channel being phase offset by 90° comprises:

a modulator configured to associate with each lower rate channel a first sinusoid and a second sinusoid, each of the first sinusoids being phase offset from all other first sinusoids by a phase offset equal to 180°/N, where N is a number of lower rate channels, and the first and the second sinusoids associated with a lower rate channel being phase offset by 90°.

22. The apparatus as claimed in claim 20 further comprising a transmitter configured to transmit the summed upconverted lower rate channels across an overlapping band of RF spectrum.

23. The apparatus as claimed in claim 20 further comprising a generator configured to generate the lower rate channels.

24. The apparatus as claimed in claim 23 wherein the generator configured to generate the lower rate channels comprises:

an encoder configured to encode source data;

a first modulator configured:

to modulate the encoded data with a channel code; and to provide a first copy of the modulated source data and a second copy of the modulated source data; and a second modulator configured to modulate the first copy with an in-phase code and the second copy with a quadrature code.

* * * * *